United States Patent [19]

Autran et al.

[11] Patent Number: 5,757,155
[45] Date of Patent: May 26, 1998

[54] APPARATUS FOR CONTROLLING A SYSTEM, SUCH AS A VEHICLE SCREEN WIPING SYSTEM, BASED UPON MODIFICATION OF A COMMAND SIGNAL, AND A METHOD OF CONTROLLING SAME

[75] Inventors: Frédéric Autran; Frédéric Bessiere; Jean Levine, all of Paris, France

[73] Assignee: Valeo Electronique, Creteil Cedex, France

[21] Appl. No.: 557,020

[22] PCT Filed: Mar. 28, 1995

[86] PCT No.: PCT/FR95/00384
    § 371 Date: Apr. 15, 1996
    § 102(e) Date: Apr. 15, 1996

[87] PCT Pub. No.: WO95/26893
    PCT Pub. Date: Oct. 12, 1995

[30] Foreign Application Priority Data

Apr. 5, 1994 [FR] France ................ 94 04277

[51] Int. Cl.$^6$ ............... H02P 1/04; B60S 1/08; G05B 19/19
[52] U.S. Cl. ............ 318/443; 318/444; 318/DIG. 2; 318/466; 15/250.17
[58] Field of Search ............... 318/340–486, 318/DIG. 2; 15/250.17

[56] References Cited

U.S. PATENT DOCUMENTS 4,742,285  5/1988  Sasaki .
5,177,418  1/1993  Muller .

FOREIGN PATENT DOCUMENTS 432 023 A1   6/1991   European Pat. Off. .
544 001 A1   6/1993   European Pat. Off. .
2 541 639    8/1994   France .
4217138 A1   4/1994   Germany .

OTHER PUBLICATIONS

"Electronic windshield wiper system I: modelling and validation", Int. J. Vehicle Design, vol. 12, No. 2, 1991.

Primary Examiner—Paul Ip
Attorney, Agent, or Firm—Morgan & Finnegan, L.L.P.

[57] ABSTRACT

The present invention relates to a method of governing a system such as a vehicle screen wiping system. It also relates to a governing apparatus for performing the method of the invention, and to a governed system of the simultaneous or synchronized type, for wiping a glass surface of a vehicle.

The governing apparatus according to the invention includes a low level control module which effects, in the system, a reversion to a stable state. The command signal from the low level control module is generated by an intermediate level control module which operates as an open loop. Finally perturbations are compensated for by a high level control module which produces a modification of the command signals in such a way as to render the governing action convergent. The modification of the command signals consists in reducing the rate of propagation of the command signals when the load increases.

13 Claims, 2 Drawing Sheets

APPARATUS FOR CONTROLLING A SYSTEM, SUCH AS A VEHICLE SCREEN WIPINGSYSTEM, BASED UPON MODIFICATION OF A COMMAND SIGNAL, AND A METHOD OF CONTROLLING SAME

BACKGROUND OF THE INVENTION

1. Field of the Invention

The present invention relates to a method of governing a system such as a vehicle screen wiping system. It also relates to a governing apparatus for performing the method of the invention, and to a governed system of the simultaneous or synchronised type, for wiping a glass surface of a vehicle.

2. Description of the Related Art

It provides a solution to the problems presented by the development of governed electromechanical systems, and in particular systems for wiping glass surfaces of vehicles, such as the front windshield or the rear window of the vehicle.

Due to the particular technical and economic environment of the automotive market, the development of any new electromechanical product for the equipment of a vehicle has to satisfy severe requirements, especially in terms of costs, development time, simplicity of manufacture, operation and maintenance.

Screen wiping systems are known in the state of the art which comprise an electric drive motor, such as a direct current motor which always rotates in the same direction, and a mechanism for converting the rotary motion of the motor into oscillating motion of one or a plurality of screen wipers. Such a converting mechanism consists for example of an arrangement comprising a linkage of the parallelogram type, or with an integral crank system.

However, the technical requirements of screen wiping are such that systems constructed in this way have to be specially developed for each particular application, that is to say for each type of vehicle.

Thus, the profile of the windshield, the nature of the screen wipers, and the speed and aerodynamic characteristics of the vehicle which is equipped with the system, are parameters which usually make it necessary to recommence study of the screen wiping system, and to provide a new industrial manufacturing facility for the said system.

Now, since the screen wiping function is not within the direct perception of the consumer, the manufacturer is led into a tendency to minimise the cost of this particular automotive function, and the extra cost and additional time involved are therefore not acceptable.

In order to overcome these drawbacks, it has also been proposed to design a governed system in which its control law is easily adaptable to specifications other than those called for by one particular product.

In particular, in an earlier proposal in a French patent, No. 2 655 301, a governed screen wiping apparatus, especially for a screen wiping system such as is shown in FIG. 3, each blade 31 or 32 is applied on a glass 30 and is actuated by an independent electric motor 33 or 34, the control law of which is pre-recorded in a trajectory table which is read at a predetermined rate.

With such an apparatus it is possible to propose systems which are adaptable for vehicles of various types. In this connection, it is possible to define a control law which is adapted to each type of vehicle, in the form of a command signal pre-recorded in a table, and held in a memory of a computer 35.

However, apparatuses of this kind do make it necessary to take control precautions that will guarantee the immunity of the system from, especially, variations in the load to which the screen wipers may be subject.

In this connection, the control law has to take into account perturbations applied externally to the physical system, without any prior knowledge of these latter. It is accordingly necessary to define an apparatus which is both stable and robust against external perturbations, which is one of the problems solved by the present invention.

Moreover, in those systems that have a plurality of screen wipers for wiping the windshield, and given that two screen wipers are controlled independently, it is necessary to consider the case in which these two screen wipers are subjected to different stresses and run the risk of interfering with each other. It is therefore necessary to provide a circuit for inhibiting the control signal for each screen wiper, in order to prevent it from reaching a prohibited position such as that occupied by the other wiper.

In this connection, each screen wiper is subject to external perturbations which may differ in their nature, or be of different amplitudes, as between one wiper and the other. For example, the presence of a leaf from a tree, adhering to the glass surface within the field of sweep of one of the wipers, or the occurrence of a side wind, may give rise to asymmetries in the stresses to which the two wipers are subject. These asymmetries can cause one of the wipers to slow down and cause the wipers to collide, this being known as interference in the language of the man in the art.

SUMMARY OF THE INVENTION

It is an object of the present invention to provide a solution to these problems in the state of the art, both in respect of the control of a single wiper, and in respect of that of a plurality of wipers, with either simultaneous or synchronised control.

In this connection, the invention is directed to a method of governing, especially for a system for wiping a glass surface of a vehicle in which at least one wiper blade is applied on a glass surface of a vehicle and driven by an electric motor, and in which at least one command signal is pre-recorded in a memory table.

In accordance with a feature of the invention, the method of governing comprises the following steps:

(a) propagation of the command signal at a first rate and execution of a control law on the basis of the said command signal, in such a way as to effect a reversion to a stable state;

(b) detection of a saturation condition in an electrical supply circuit of the motor;

(c) modification of the propagation rate of the command signal when a saturation condition is detected, in such a way as to take into account difficulties encountered by the electric drive motor, that is to say by the governed system in relation to its load.

In accordance with further features of the invention, taken separately or in combination:

the modification of the propagation rate of the command signal consists in reading values of the command signal pre-recorded in the memory table, at a second rate, slower than the said first rate, when the load on the electric drive motor increases;

the rhythm in which the memory table is read is given by a read signal which is derivable n times, n being equal to the order of the model adopted for the screen wiping system to be governed, in such a way as to avoid sudden changes.

The invention is also directed to an apparatus for performing such a method, which comprises three control modules corresponding to three levels of control, namely:

a low level control module, for operating as a closed loop and comprising a stabilising loop circuit together with an electrical supply circuit for the motor;

an intermediate level control module, for operating as an open loop and comprising a circuit for generation of the command signals of the low level control module by reading the said command signals in at least one memory table;

a high level control module, for operating as a closed loop and comprising a circuit for modification of the command signals applied to the intermediate level control module.

According to a feature of the invention, the stabilising loop circuit of the low level control module is an integral proportional (IP) loop circuit acting in feedback mode on the single information signal representing the position of the wiper.

According to a feature of the invention, the command signals comprise at least two components, namely:

a command signal for the position of the wiper;

a motor voltage command signal.

According to a feature of the invention, the command signal modification circuit in the high level module has at least two inputs, on which it receives, respectively, a signal representing the detection of saturation of the control signal generated by the electrical supply circuit of the motor, and a voltage signal for control of the motor, generated by the stabilising loop circuit of the low level control module.

According to a feature of the invention, the command signal modification circuit of the high level module comprises a circuit for computing the integral of order n, with respect to time, of the difference between the said signal representing the detection of saturation of the control signal, and the said voltage signal for control of the motor, n being the order of the model which is characteristic of the governed system.

Finally, the invention provides a governed system for wiping a glass surface of a vehicle, of the simultaneous or synchronised type, characterised in that it includes at least one apparatus of the kind described above.

More particularly, it provides a governed screen wiping system of the synchronised type, which is characterised in that it includes at least two screen wipers, each of which is controlled by a governed device, each governed device comprising:

a command signal modification module;

a command signal generating module;

a stabilising loop circuit respectively;

an electrical supply circuit;

and an electromechanical assembly, in that a voltage control signal is taken at the output of each stabilising loop circuit and passed to the "+" input of an adder of the command signal modification circuit, in that a real or actual voltage control signal is taken at the output of each electrical supply circuit and passed to the "−" input terminal of the adder of the said command signal modification circuit, and in that each command signal modification circuit comprises a circuit for computing the integral of order n with respect to time, n being the order of the model which is characteristic of the governed systems, of the signal prevailing at the output of the adder, with the said circuit producing a read signal which is coupled to the input of a synchronising module, the output of which produces a read signal representing the rhythm at which the command signals which must be applied to each command signal generating module are to be propagated.

It is an advantage of the invention that it results in the predetermined trajectory being followed with precision and stability.

It is a further advantage of the present invention that it produces a governing function which is insensitive to load and to perturbation.

Further features and advantages of the present invention will be understood more clearly with the aid of the description and the drawings, which are as follows:

DETAILED DESCRIPTION OF THE PREFERRED EMBODIMENTS

Figure 1:
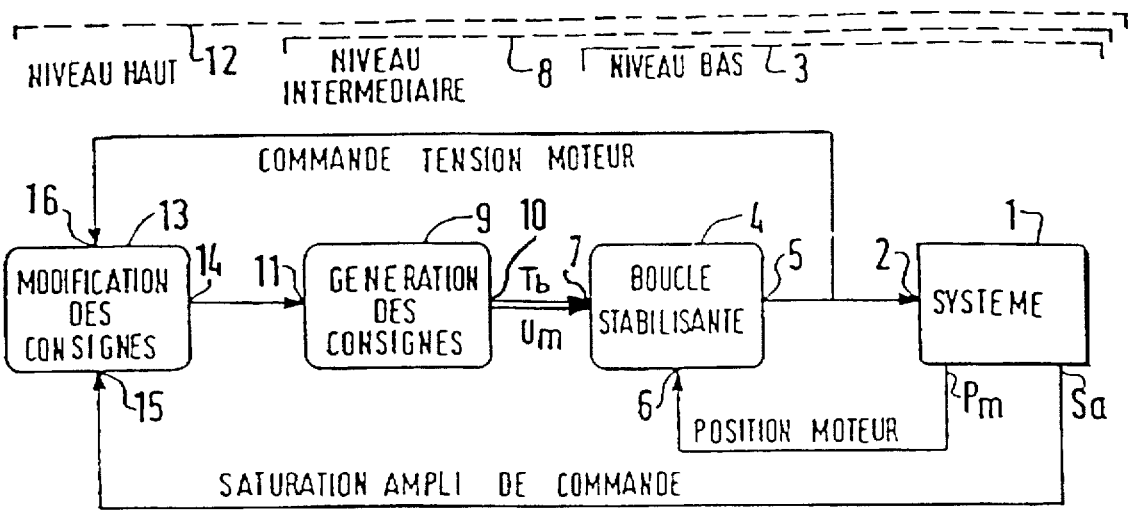
FIG. 1: a general diagram of an apparatus for performing the method of the invention.

Since the drawings, as represented by the Figures thereof, essentially comprise positively characterised elements, they are to be regarded as being incorporated in the present description, and will therefore be able not only to complete the latter, but also, if necessary, to contribute towards defining the invention.

We shall first describe the principle of the invention in so far as it is applicable to the control of a single wiper. We shall then, with reference to FIGS. 3, 4 and 5, proceed to describe how in enables the problem of controlling a plurality of blades to be overcome in such a way as to suppress any danger of interference.

The method of governing according to the invention, which is applied for example to the governing of the position of a screen wiper blade on a glass surface of a vehicle, makes use of the concept of an automatic system and employs a regulating loop or governing loop, which enables the motion of a wiper to be controlled, and hence enables its instantaneous position to be set.

In this example, the system comprises a plurality of sub-systems which are as follows: the wiper, comprising an arm and a wiper blade, the electric motor for driving the wiper, the speed reduction unit of the motor, and the load, the latter consisting of the friction forces set up by contact between the wiper blade and the glass together with the aerodynamic forces exerted on the wiper.

Such a system is configured in accordance with the laws of automatic operation, by selecting a control model which is inverted in order to define a set of predetermined control command signals, which are used for generating control values. The model for control of the system is defined by the designer of the automatic system in such a way that the governed mechanism (or physical system) is governed in such a way as to follow a predetermined trajectory.

As is well known to the main in the art, the system (the automatic system) is characterised by its order, which is designated by n in what follows. The model for a system of order n is represented mathematically by a matrix of order n, that is to say a matrix n×n. This matrix contains the value of the coefficients or parameters of the model, for example the value of the gain of the motor when considered as an amplifier, the value of the coefficient of stiffness of the wiper, the value of the reduction ratio of the speed reduction unit, that of the inertia of the motor, etc. It is also called the transfer matrix of the system.

The parameters of the model can also be left in the form of variables, the values of which may not be specified till later so as to take real operating conditions into account. In the prior art, such a parameter the value of which is only specified later may be the coefficient of friction of the wiper blades on the glass, which depends in particular on atmospheric conditions (ice, rain, dry weather etc.), on wiper blade wear, etc. The expression of the command signals thus contains variables, and their value must be calculated on the basis of numerical data corresponding to these variables.

In this connection, inversion of the model so as to generate the command signals consists in carrying out the mathematical operation of inverting its transfer matrix. This operation produces an expression of the command signals, in the form of an arithmetical expression which contains variables if the matrix of the model contains any. It is quite clear that inversion of the matrix calls for certain mathematical conditions to be satisfied which have to be verified, for each variable in the model, at least over a predetermined range of variation which is referred to as the authorised range of variation.

Now, it is known in the prior art to make use, in the governed system, of feedback loops which operate by modifying the value of the coefficients in the model, so as to take into account effects which are not modelled. These effects may moreover be of an empirical kind which are a priori not capable of being modelled. In the case of a screen wiping system, these effects are for example associated with external perturbations due to wind, to the presence of dirt or mud on the glass, and so on.

It is therefore necessary either to modify the value of the coefficients of the model that are present in its transfer matrix, and to invert this matrix again in order to obtain the value of the command signals directly, or else to calculate the value of the command signals from their arithmetical expression which contains the variables mentioned above.

This modification of the coefficients in the model, also referred to as adaptation, has two major drawbacks.

The first drawback lies in the complexity of the matrix inversion calculations that have to be carried out at each adaptation, and which call for the use of an electronic device which has a high computing power, and which is therefore expensive, this being in proportion to the degree of precision in the model adopted for the physical system.

The second drawback, which leads to the same consequences as the first, lies in the fact that the transfer matrix of the system, or the expressions of the command signals that flow from it, can develop to values which are not pertinent to their ranges of authorised variation, and which correspond to zones of instability in the physical system (this being manifested by the presence of unstable poles in the matrix of the model, which accordingly becomes divergent). As a result, and in order to avoid divergence of the system, it is necessary to exercise strict control over the development of the values of the coefficients in the model, in such a way as to keep them away from the unstable zones.

This requirement leads to the use of a regulating regime which is difficult to achieve with the limited computing means available for use in an automotive application. In this connection, the control system for a screen wiper must be designed around an inexpensive autonomous component such as a microprocessor, the processing capacity of which does not permit algorithms of too much complexity to be implemented.

It is an object of the present invention to propose a method of controlling a governed system such as a vehicle screen wiping system, which is not sensitive to load and external perturbations in the absence of any measurement or prior knowledge of these latter, and without adaptation of the coefficients in the model.

In this connection, the principle of the invention consists in causing the rate of propagation of the command signal to vary as a function of the difficulties encountered by the motor, that is to say by the governed system in relation to its load. It thus avoids the need to modify the coefficients in the model.

Accordingly, the command signals are computed beforehand, for example during calibration of the apparatus in the laboratory, after the control model corresponding to the physical system to be governed has been defined.

The command signals are then tabulated, that is to say they are entered in tables in the memory of a microprocessor which constitutes the main component of the screen wiper apparatus in accordance with the invention.

The advantage lies in the fact that the command signals are computed once and for all, while the large computer apparatus that is commonly used in a laboratory can be employed for this purpose. As a result it is possible to use a model for the system which takes many parameters into account, so as to achieve more accurate modelling of the real system. This complexity of the model is no longer a disadvantage in accordance with the invention, because the model is inverted only once, in the laboratory, and no subsequent adaptation of its coefficients is carried out.

The command signals, produced in the laboratory by inversion of the model of the system, are therefore tabulated. In the context of the control of the physical system, it only remains to read the memory tables containing the control signals, this being done at a predetermined rate.

In this connection, the addresses in these tables are read sequentially as a function of an addressing timer, the frequency of which is governed according to an addressing parameter as will be explained later herein, in such a way as to modify the command signals in accordance with the perturbations.

In the remainder of this description, the expression "modification of the command signal" is to be understood as meaning a modification of the rate of propagation of the command signal, or the rate at which the tables are read, and not a modification of the values of the parameters in the model of the system.

In a preferred embodiment, the command signal comprises two components, which are as follows:

firstly, the signal Tb for the position of the wiper;

secondly, the signal Um for the motor voltage.

In fact, the trajectory assigned to the wiper, as defined in the model that is adopted, may include components other than the single command signal for the position of the wiper. Thus, in some possible embodiments of the invention, the position control signal Tb for the wiper could be replaced by a command vector for the trajectory of the wiper which will include not only the said position command signal, but also, and without limitation, a speed command signal, an acceleration command signal, and so on.

In what follows, the real time t of the system, imposed by the rhythms of the internal timer of the microprocessor, will be noted. Similarly the propagation time T of the command signal will be noted, that is to say the rhythm according to which the command values are read in the tables of the microprocessor memory, and, as has been stated, the method of the invention consists in modifying the value of the propagation time T in accordance with perturbations external to the system.

FIG. 1 shows a general diagram of an apparatus for performing the method of the invention.

This apparatus has three levels, each of which has a precise function, namely:

a low level 3, constituting a regulating loop and serving as a low level control;

an intermediate level 8, the function of which is to generate the command signals for the regulating loop at the low level;

and a high level 12, comprising a loop the purpose of which is to modify the said command signals.

We will now describe in detail the function and structure of each of these levels, making reference to corresponding control modules.

The control module at the low level 3 of the governed system comprises, in general terms, a closed loop feeding back the instantaneous value Pm of the position of the wiper. The low level loop 3 includes a circuit 4, referred to as a stabilising loop circuit, together with the system 1, which is the physical system to be governed, that is to say, here, the assembly comprising in particular the motor, the speed reduction unit and the wiper.

The system 1 also includes an electrical supply circuit or power circuit, a control input terminal 2 of which is accessible, and which is connected to the terminals of the direct current electric motor, the rotatable shaft of which is coupled to the speed reduction unit that drives the wiper, the blade of which is applied on the glass surface of the vehicle.

The electrical supply circuit, also referred to as a control amplifier or "control amp", produces a bipolar wave of width modulated pulses. The width of the electrical supply wave determines the values of the motor torque and the speed which it is desired to apply to the wiper in the real situation. The polarity of the electrical supply wave determines the direction of rotation, and the latter is reversed at the end of each stroke in the trajectory of the wiper, by reversing the polarity of the electrical supply wave.

The stabilising loop circuit 4 receives, on its input 7, the two components Tb and Um of the command signal, and produces at its output 5 a control signal Uc for the motor voltage, this being taken to the control input of the electrical supply circuit for the motor in the system 1.

In a preferred embodiment of the invention, the stabilising loop circuit 4 is a proportional and integral feedback circuit, and has three input terminals which are as follows:

an input terminal for the transmitted command signal Tb for the blade position;

an input terminal for the motor voltage command signal Um;

an input terminal for a motor position signal Pm.

In this connection, the system 1 further includes a motor position sensor which produces an output signal Pm from the system.

In a preferred embodiment, the motor position sensor consists of a sensor that comprises two Hall effect cells which produce a signal by shaping, with suitable logic combination of the two output signals from the cells, in such a way as to produce a signal which represents the motor position, and also, possibly, the direction of rotation of the motor.

In another embodiment, the motor position sensor consists of a circuit for measuring the fluctuations in current passing through the electric motor, from which the motor speed information is deduced. An integrator circuit recovers the motor position signal Pm, that is to say the signal representing the position of the wiper in its trajectory.

In a third possible embodiment, observation of the position Pm of the motor is performed by integration of its speed Vm, which is measured with the aid of a Hall effect detector disposed on the output shaft of the motor.

The stabilising loop circuit 4 thus includes an input terminal 6 for the motor position signal Pm, which it converts into a signal representing the real position of the wiper in its real trajectory with the aid of an observation circuit, also referred to as a reconstructing circuit and not shown in the drawing.

In a simplified embodiment, the reconstructing circuit, which converts the motor position signal Pm into a wiper position signal, comprises a simple multiplier having a gain 1/N, where N is the ratio of the speed reducing unit.

In another embodiment, the multiplier with its gain of 1/N is preceded by a stationary Kalman filter, which depends on the torque constant Kc of the electric motor and on the elastic stiffness constant Kb of the wiper blade carrier.

In addition, the electrical supply circuit in the system 1 is coupled to a circuit for generating a signal Sa which represents saturation of the electrical supply circuit. Such a circuit, not shown in FIG. 1, detects in practice the execution of the maximum command signal, representing the fact that a high load is being applied to the physical system.

The signal representing saturation of the electrical supply circuit is available at the output of the system 1 in the form of the saturation signal Sa.

Figure 2:
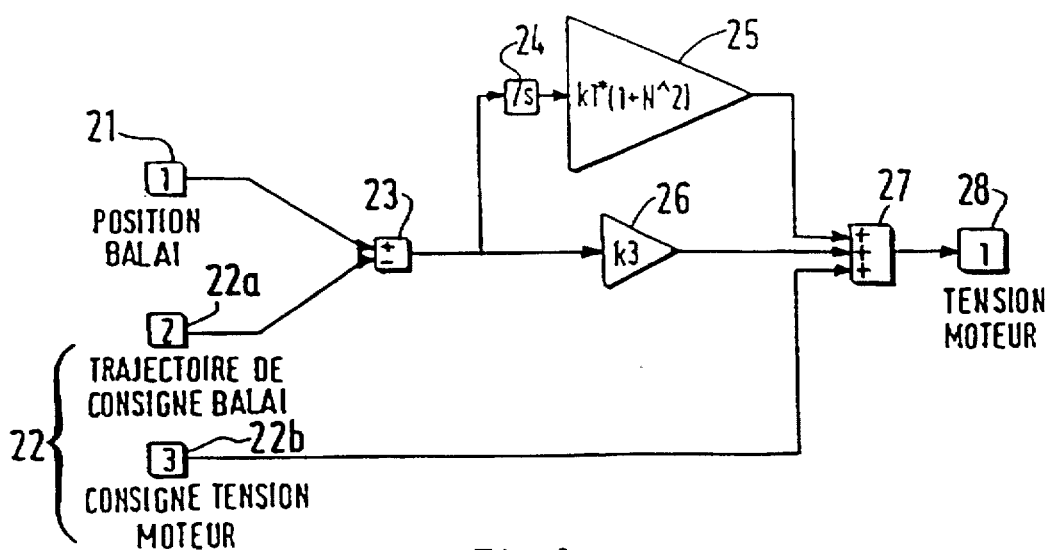
FIG. 2: a diagram of a preferred embodiment of a part of the apparatus for performing the method of the invention.

FIG. 2 shows a preferred embodiment of the stabilising loop circuit 4 for the low level control module 3 of the apparatus for performing the method of the invention.

The stabilising loop circuit shown in FIG. 2 is an integral proportional (IP) feedback loop for the single signal of the position of the wiper, obtained from the output of the reconstructor. Such a circuit enables the stability of the slow part of the governed system to be augmented.

The integral proportional loop circuit of FIG. 2 accordingly includes an input terminal 21 for the wiper position signal, reconstructed by the reconstructor circuit with the aid of the data as to the motor position Pm, applied to the input terminal 6 of the stabilising loop circuit 4.

It also includes an input terminal 22 which is connected to the input terminal 7 of FIG. 1, and which supplies to the circuit of FIG. 2 the two instantaneous command signal values Tb and Um that are necessary in order to achieve control of the system 1, in the following way:

the wiper position command signal Tb is transmitted on to an input terminal 22a;

the motor voltage command signal Um is transmitted on to an input terminal 22b.

The integral proportional loop circuit includes a subtractor 23, the "+" terminal of which receives the wiper position signal from the input terminal 21, with its "−" terminal receiving the predetermined wiper trajectory signal (that is to say the position command signal, in the simplified embodiment of the invention), which is received from the input terminal 22a. The output of the subtractor 23 is connected firstly to the input of an integrating cell 24, and secondly to a multiplier having a gain k3, indicated at 26 in the drawing.

The output of the integrator 24 is connected to a multiplier having a gain $k1*(1+N^2)$, referenced 25, in which $N^2$ represents the squaring of the reduction ratio N which is characteristic of the speed reducing unit coupled to the shaft of the motor.

The stabilising loop circuit in FIG. 2 further includes an adder 27, the input terminals of which are connected, respectively, to the output terminal of the multiplier 25, to the output terminal of the multiplier 26, and to the input terminal 22b that receives the motor voltage command signal Um.

The output terminal of the adder 27 is connected to the output terminal 28 of the stabilising circuit of FIG. 2 that produces the control signal Uc for the motor voltage.

Reverting to FIG. 1, the motor voltage control signal Uc is available at the output 5 (similar to the output 28 of the circuit shown in FIG. 2) of the stabilising loop circuit 4. It is passed, firstly to the input 2 of the electrical supply circuit for the physical system 1, and secondly to the circuit 13 for the modification of the command signals, the function of which is described in detail later herein, in the context of the high level control module.

FIG. 1 also shows the control module at the intermediate level 8, which operates as an open loop and which includes a circuit 9 for generating the command signals, which are delivered by this circuit on its output terminal 10.

The command signal generating circuit 9 preferably produces the instantaneous magnitudes of the wiper position command signal Tb and of the motor voltage command signal Um.

As has been stated, in accordance with the invention, the generation of the command signals consists in reading the instantaneous values of the command signals Tb and Um in the previously entered tables.

The reading of these tables is carried out at the rhythm of a read signal which is applied to the input terminal 11 of the command signal generating circuit 9.

Finally, the governed system of FIG. 1 includes a control module at the high level 12, which operates as a closed loop by taking as feedback signals, firstly the detection signal Sa representing saturation of the control signal for the electrical supply circuit, and secondly, the motor voltage control signal Uc.

The signal Sa is received on a first input terminal 15 of the command signal modification circuit 13, and the signal Uc is received on a second input 16 of the said circuit 13.

The command signal modification circuit 13 produces on its output terminal 14 a signal for modification of the command signals which are bound for the command signal generating circuit 9 in the control module at the intermediate level 8. As has already been stated, this signal is, in accordance with the invention, a signal for reading the tables containing the instantaneous values of the command signals. This signal is analogous to a time, in that it determines the time T over which the command signal is propagated.

It has been found that, in order that modifications to the command signal, that is to say to the rate of propagation of the command signal, shall be produced without any sudden changes, it is necessary that the propagation time T should be derivable n times with respect to the real time, n being always equal to the order of the system.

Sudden changes in the variation of the propagation rate of the command signal are manifested in the form of jerks in the motion of the wiper over the glass surface.

In one preferred embodiment of the invention, the system is of order 4. It is then necessary that the propagation time T be able to be derived four times with respect to the real time t. In this connection, the fourth derivative of the propagation time T has to be modified.

However, in practice it can be that the coefficients that appear before some terms in the derivative of T which is of an order greater than or equal to two are so small that they can be ignored.

In order to be certain of having a propagation time T which can be derived four times with respect to the time t, and which is a function of the load, it has been shown to be advantageous to define the propagation time T as the fourth integral of the difference between the theoretical control signal and the saturated control signal of the motor, that is to say, in general, that of the maximum value of the control signal applied to the system.

Thus, the circuit 13 for modification of the command signals takes account, after the saturation signal Sa, of the occurrence of perturbations, in particular those connected with a severe increase in the friction effects associated with the displacement of the wiper over the glass surface.

When the load applied to the system subsequently diminishes so as to revert to a value which conforms with that defined in the adopted model, the difference between the theoretical control signal and the saturated control signal of the motor diminishes, and the value of the time T of propagation of the command signal tends towards a value T0 or reference value, which applies in the absence of any perturbations. This value T0 is defined, for example, as the value of at least one integration constant use in the computation of the propagation time T of the command signal.

In order to explain the procedure in the method of the invention, we will consider the following example.

Let us suppose that the command signal Um for the control voltage of the motor is equal to 10 volts at the instant concerned, that is to say it is written into the tables that, at this predetermined instant and in order to produce the command signal Tb for the wiper position, the motor must in theory be supplied at 10 volts.

Let us further suppose that, due to an external perturbation such as, for example, the presence of snow on the windshield, the wiper is subjected to an increased load, that is to say a load which is higher, for any reason, than that provided for that instant in the wiping cycle by the model of the system initially adopted.

In order to maintain a real trajectory which is in conformity with the wiper position command signal Tb, the low level stabilising loop proceeds to generate a motor control signal Uc which is for example equal to 14 volts. That signifies that, in order to overcome the load applied to the wiper, the electric motor must in reality be supplied at 14 volts and not at 10 volts as provided for by the motor voltage control command signal Um.

Let us finally suppose that the battery voltage is equal to 12 volts at this instant. The electrical supply circuit for the motor will be incapable of generating a real control voltage greater than 12 volts, this value being the saturation value Sa of the electrical supply circuit for the motor.

The difference between the required voltage of 14 volts on the one hand, and the available voltage of 12 volts on the other hand, constitutes an error signal, on the basis of which the propagation time of the command signals is then modified in accordance with the principle of the invention.

The propagation of the command signal slows down when the motor begins to labour, when there are high loads that are not recognised by saturation of the control signal to the motor.

The propagation of the command signal is maintained at a constant rate (linked to the reference propagation time TO) when the motor control signal is not saturated.

Figure 3:
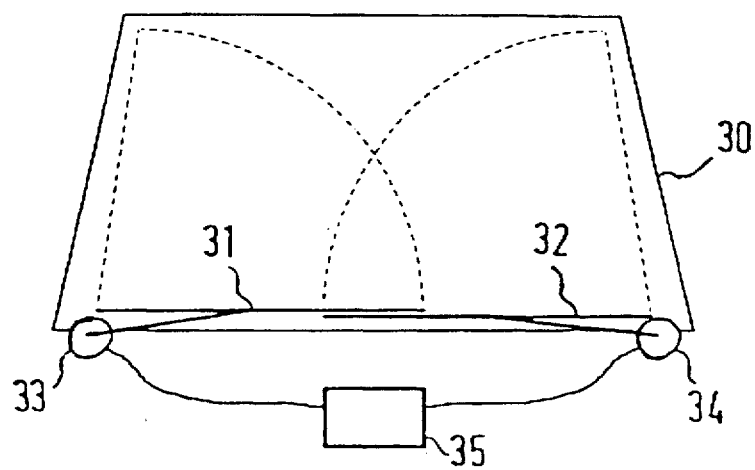
FIG. 3: a diagram of a vehicle screen wiping system which makes use of two screen wipers.

FIG. 3, already described, shows a wiping apparatus comprising two independent screen wipers 31 and 32. The method of control in accordance with the invention can be applied with advantage to the control of the wipers in such an apparatus. It is possible to control this wiping apparatus in two different modes, referred to as the simultaneous mode and the synchronised mode.

The simultaneous mode is such that control of each wiper is completely independent of the control of the other wiper, each of the control laws used being such that it takes into account the occurrence of external perturbations.

The synchronised mode is such that the control of each wiper is governed in response, in particular, to at least one information signal as to the behaviour of the other wiper, in such a way as to govern the control of each wiper by integrating a parameter which is linked to the behaviour of the other wiper. The synchronised mode gives an improved solution to the problems of interference.

Figure 4:
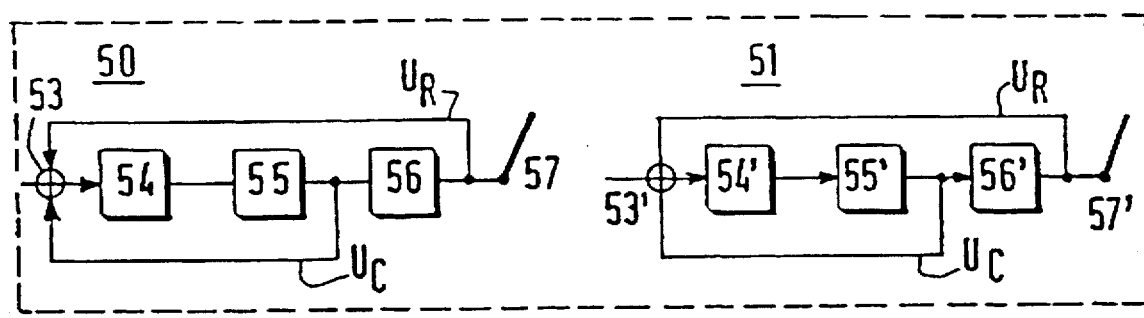
FIG. 4: a governed system for vehicle screen wiping in a simultaneous mode.

FIG. 4 shows a diagram of a controlled system for vehicle screen wiping, employing the method of the invention in the context of control in the simultaneous mode.

The screen wiping system includes, for each screen wiper 50 or 51, a command signal modification module 53 or 53', a command signal generating module 54 or 54', a stabilising loop circuit 55 or 55', an electrical supply circuit 56 or 56' for the physical system, and the said physical system, or electromechanical assembly, 57 or 57'. This electromechanical assembly comprises an electric motor, a mechanical speed reducing unit, a screen wiper, and a load which consists in the application of the screen wiper on the glass surface in the course of a wiping operation.

A voltage signal Uc for control of the motor is taken at the output of the stabilising loop circuit 55 or 55', and passed to the "+" input of an adder in the command signal modification module 53 or 53'.

A real voltage control signal Ur is taken at the output of the electrical supply circuit 56 or 56', and is passed to the "−" input terminal of the adder in the command signal modification circuit 53 or 53'.

The error signal produced at the output of the adder is integrated four times (for a system of the fourth order), so as to produce the signal for reading the memory tables containing the values of the command signal. This read signal, representing the propagation time of the command signal, is coupled to the input of the module 54 for generating the command signal.

Figure 5:
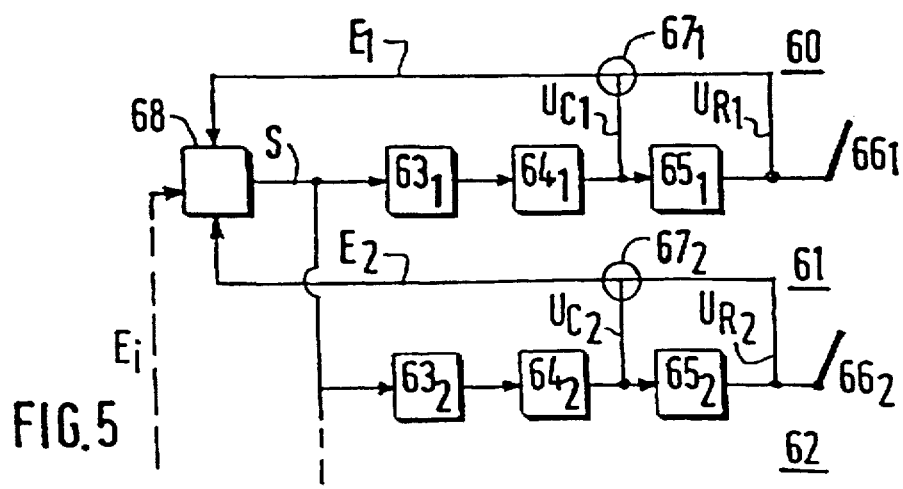
FIG. 5: a governed system for vehicle screen wiping in a synchronised mode.

FIG. 5 shows the application of the invention to a screen wiping system controlled in the synchronised mode.

In accordance with one aspect of the invention, two or three wipers are provided, each of these being driven by its own motor. The state of each wiper is taken into account in such a way as to control the generation of the control law in a synchronised manner with respect to the other wipers.

Accordingly, the wiping system includes a plurality of governed systems 60, 61, 62 . . . , connected in parallel.

Each governed system is of the kind shown in FIG. 4, and includes, using the notation in FIG. 5:

a command signal modification module $67_1$, $67_2$, $67_i$, respectively;

a command signal generating module $63_1$, $63_2$, $63_i$, . . . , respectively;

a stabilising loop circuit $64_1$, $64_2$, $64_i$, . . . respectively;

an electrical supply circuit $65_1$, $65_2$, $65_i$ of the physical system;

and an electromechanical assembly $66_1$, $66_2$, $66_i$, . . . , respectively.

A voltage control signal $Uc_i$ is taken at the output of each stabilising loop circuit $64_i$ and passed to the "+" input of an adder in the command signal modification module $67_i$.

Similarly, a real voltage control signal $Ur_i$ is taken at the output of each electrical supply circuit $65_i$, and passed to the "−" input terminal of the adder in the command signal modification module $67_i$, mentioned above.

As has been explained earlier herein, when the load on the wipers is high, the real voltage control signal $Ur_i$ is typically equal to the saturation value of the electrical supply circuit to the motor.

Each read signal $E_i$, produced at the output of the adder of each command signal modification module $67_i$, is coupled to the input of a synchronising module 68, the output of which produces a read signal S that represents the rhythm of propagation of the command signal which must be applied to each command signal generation module $63_i$.

The read signal S is thus common to all of the controlled systems 60, 61, 62, . . . connected in parallel.

The synchronising module 68 is a circuit for detecting the minimum value of the read signals $E_i$ which are applied to its inputs, and for copying this minimum value on its output. Thus, the signal S enables the propagation of all the command signals to be controlled at a rate which corresponds to the slowest speed required by any one of the wipers to overcome the load to which it is subjected.

In another possible embodiment of the invention, the synchronising module may work directly on the totality of the error signals which are defined by the difference between the control voltage signal $Uc_i$ and the real control voltage signal $Ur_i$.

In that embodiment, the common synchronising module receives the error signal derived from the output terminal of the adder in each command signal modification module, and ensures synchronisation by determining and copying the greatest error signal, its value being retransmitted to the control input of each one of the command signal modification modules $67_i$.

The present invention has been described in the context of a screen wiping system. It is however clear that it is applicable to any governed system, and in particular to any electromechanical system.

We claim:

1. A method for wiping a glass surface of a vehicle with at least a first wiper blade driven by a first electric motor, the method comprising the following steps:

(a) reading a command signal at a first propagation rate;

(b) operating the first electric motor in accordance with said command signal read at said first propagation rate;

(c) detecting a saturation condition in an electrical supply circuit of the first electric motor;

(d) modifying said first propagation rate of the command signal to a second propagation rate when said saturation condition is detected, into account difficulties encountered by the first electric motor, that is to say by the governed system in relation to its load; and (e) operating the first electric motor in accordance with the command signal being read at said second propagation rate.

2. A method according to claim 1, wherein said second propagation rate is slower than said first propagation rate.

3. A method according to claim 2, wherein a system comprising the first wiper blade and the first electric motor has an order equal to n, and wherein said first propagation rate corresponds to a first propagation time period which is derivable n times.

4. The method of claim 1 wherein the vehicle further includes a second wiper blade and a second electric motor associated therewith, the method further comprising the steps of:

operating the second electric motor in accordance with said command signal read at said first propagation rate; and operating the second electric motor in accordance with said command signal read at said second propagation rate upon detection of said saturation condition in said electrical supply circuit of the first electric motor.

5. Apparatus for controlling an electric motor that is subject to varying loads, the apparatus comprising:

a low level control module for operating as a closed loop, said low level control module having command signals, a stabilizing loop circuit, and an electrical supply circuit for the motor;

an intermediate level control module for operating as an open loop, said intermediate level control module having command signals, and a circuit for generation of said command signals of said low level control module based on predetermined command signal values; and a high level control module for operating as a closed loop, said high level control module having a circuit for modification of said command signals of said intermediate level control module.

6. Apparatus according to claim 5, wherein said stabilizing loop circuit of said low level control module is an integral proportional (IP) loop circuit acting in feedback mode and having as an input a signal representing wiper position.

7. Apparatus according to claim 5, wherein said command signals of said low level control module include:

a command signal (Tb) for the position of the wiper; and a motor voltage command signal (Um).

8. Apparatus according to claim 5, wherein said command signal modification circuit in said high level module has as inputs a signal (Sa) representing detection of saturation of a control signal generated by said electrical supply circuit of the motor, and a voltage signal (Uc) for control of the motor, said voltage signal (Uc) generated by said stabilizing loop circuit of said low level control module.

9. Apparatus according to claim 8, wherein the electric motor has at least one wiper blade attached thereto, the electric motor and wiper blade comprising a system of order n, and wherein said command signal modification circuit in said high level module comprises an integrator circuit for computing an integral of order n, with respect to the time t, of a difference between said signal (Sa) representing detection of saturation of said control signal and said voltage signal (Uc) for control of the motor.

10. A system for controlling at least two electromechanical devices in synchronous mode, each electromechanical device having associated therewith a respective electrical motor and a respective control device, each control device comprising:

an electrical supply circuit coupled to the respective motor, said electrical supply circuit having as an output an actual voltage control signal;

a stabilizing loop circuit coupled to said electrical supply circuit, said stabilizing loop circuit having as an output a motor voltage control signal;

a command signal modification circuit having an adder, said adder including an output, a positive input, and a negative input, said motor voltage control signal coupled to said positive input and said actual voltage control signal coupled to said negative input, and an integrator circuit coupled to said adder output, said integrator circuit having as an output a read signal;

a command signal generating module coupled to said stabilizing loop circuit, said command signal generating module having a memory device with instantaneous command signal values stored therein, said command signal generating module reading said values at a first propagation rate; and wherein said system further includes a synchronizing module having as inputs said integrator read signals and having as an output a synchronized read signal S which is based on said integrator read signals, and wherein said first propagation rate is based on said synchronized read signal.

11. The system of claim 10 wherein each of the electromechanical systems has an order of n and wherein said integrator circuit computes an integral of order n of said adder output.

12. The system of claim 10 wherein said synchronized read signal is equal to a minimum of said integrator read signals.

13. The system of claim 10 wherein each of the electromechanical devices includes a screen wiper.

\* \* \* \* \*